US012563422B2

(12) United States Patent　　　(10) Patent No.: US 12,563,422 B2

Agarwal　　　　　　　　　　　　　(45) Date of Patent: Feb. 24, 2026

(54) INTELLIGENT SYNTHETIC DATA INJECTION

(71) Applicant: DISH Wireless L.L.C., Littleton, CO (US)

(72) Inventor: Arpit Agarwal, Highlands Ranch, CO (US)

(73) Assignee: DISH Wireless L.L.C., Littleton, CO (US)

( * ) Notice: Subject to any disclaimer, the term of this patent is extended or adjusted under 35 U.S.C. 154(b) by 358 days.

(21) Appl. No.: 18/462,273

(22) Filed: Sep. 6, 2023

(65) Prior Publication Data

US 2025/0081006 A1　　Mar. 6, 2025

(51) Int. Cl.
　　*H04W 24/06*　　　(2009.01)
　　*H04L 43/50*　　　(2022.01)
(52) U.S. Cl.
　　CPC ............. *H04W 24/06* (2013.01); *H04L 43/50* (2013.01)
(58) Field of Classification Search
　　CPC ...... H04W 24/06; H04W 16/22; H04L 43/50; H04L 41/145
　　See application file for complete search history.

(56) References Cited

U.S. PATENT DOCUMENTS

2019/0140910 A1*　5/2019　Ganapathi ............. H04L 41/145
2019/0215707 A1*　7/2019　Jackson ................. H04B 17/29
2020/0374751 A1*　11/2020　Krishnaswamy ..... H04W 24/02
2022/0095122 A1*　3/2022　Emani ..................... H04L 41/22
2022/0138081 A1*　5/2022　Varma ................. G06F 11/3684
　　　　　　　　　　　　　　　　　　　　　　717/124
2022/0408284 A1*　12/2022　Soulhi ................ H04B 17/3912
2024/0276295 A1*　8/2024　Prasad .................... H04L 69/22
2025/0021861 A1*　1/2025　Sun ........................ H04W 24/06
2025/0106647 A1*　3/2025　Pateromichelakis . H04W 24/06
2025/0126497 A1*　4/2025　Villasante Marcos ......................
　　　　　　　　　　　　　　　　　　　　　　G06N 3/0475

* cited by examiner

*Primary Examiner* — Margaret G Webb

(74) *Attorney, Agent, or Firm* — Kilpatrick Townsend & Stockton LLP

(57)　　　　　ABSTRACT

A method may include providing an amount of first data and increasing the amount of first data until a first network component fails. The method may include determining first failure data associated with the failure of the first network component. The method may include providing an amount of second data and increasing the amount of second data until a second network component fail. The method may include determining second failure data associated with the failure of the second network component. The method may include generating synthetic data. The method may include providing the synthetic data such that one or more network components fail. The method may include determining third failure data associated with the failure of the network component and the synthetic data. The method may include generating the network parameters based at least in part on the third failure data.

20 Claims, 7 Drawing Sheets

300

301

400

600

Provide an amount of first data — 602

Increase the amount of first data — 604

Determine first failure data — 606

Provide an amount of second data — 608

Increase the amount of second data — 610

Determine second failure data — 612

Generate synthetic data — 614

Provide the synthetic data — 616

Determine third failure data — 618

Generate network parameters — 620

INTELLIGENT SYNTHETIC DATA INJECTION

BACKGROUND

As mobile networks become more complicated, the number of components included in a network are needed, and thus provide more potential failure points. With as many components as may be typically included in a standalone 5G architecture, an efficient method of identifying failure points is needed.

BRIEF SUMMARY

A method may include providing, by a computing device and to a 5G network, an amount of first data of a first data type, the 5G network may include a plurality of network components. The method may include increasing, by the computing device and to the 5G network, the amount of first data of the first data type until a first network component of the plurality of network components fails. The method may include determining, by the computing device, first failure data associated with the failure of the first network component of the plurality of network components and the first data type. The method may include providing, by the computing device and to the 5G network, an amount of second data of a second data type. The method may include increasing, by the computing device and to the 5G network, the amount of second data of the second data type until a second network component of the plurality of network components fails. The method may include determining, by the computing device, second failure data associated with the failure of the second network component and the second data type. The method may include generating, by the computing device, synthetic data based at least in part on the first failure data and the second failure data, the synthetic data including at least one of the first data type and the second data type. The method may include providing, by the computing device and to the 5G network, the synthetic data such that one or more of the plurality of network components fails. The method may include determining, by the computing device, third failure data associated with the failure of the network component and the synthetic data. The method may include generating, by the computing device, network parameters associated with the network component, the network parameters based at least in part on the third failure data.

In some embodiments, the method may include monitoring, by the computing device, a performance metric of the 5G network while the synthetic data is being provided to the 5G network. The method may also include determining, by the computing device, that one or more network components of the plurality of network components are likely to fail based at least in part on the performance metric. In response to determining that one or more network components of the plurality of network components are likely to fail, the method may include determining, by the computing device, a dynamic threshold associated with the performance metric. The dynamic threshold may include a data mix of at least the first and second data types in respective amounts. The computing device may use a machine learning model to generate the synthetic data. The first data type may be voice data and the second data type is application data. The synthetic data may include at least one of voice data, application data, and short-messaging service data. The plurality of network components may be implemented in a cloud-based architecture hosted by a public cloud-services provider. The 5G network may be a test-environment replica of a live 5G network and the network parameters may be applied to the live 5G network. The synthetic data may be based at least in part on historical data associated with the 5G network.

A system may include one or more processors, a data injector, a synthetic data generator, a network monitor, a network parameter generator, and a non-transitory computer-readable memory including instructions that, when executed by the one or more processors, cause the system to perform operations. According to the operations, the data injector may provide, to a 5G network, an amount of first data of a first data type. The 5G network may include a plurality of network components. The data injector may increase the amount of first data of the first data type until a first network component of the plurality of network components fails. The network monitor may determine first failure data associated with the failure of the first network component of the plurality of network components and the first data type. The data injector may provide, to the 5G network, an amount of second data of a second data type. The data injector may increase the amount of second data of the second data type until a second network component of the plurality of network components fails. The network monitor may determine second failure data associated with the failure of the second network component and the second data type. The synthetic data generator may generate synthetic data based at least in part on the first failure data and the second failure data. The synthetic data including at least one of the first data type and the second data type. The data injector may provide, to the 5G network, the synthetic data such that one or more of the plurality of network components fails. The network monitor may determine third failure data associated with the failure of the network component and the synthetic data. The network parameter generator may generate network parameters associated with the network component, the network parameters based at least in part on the third failure data.

In some embodiments, the network monitor may monitor performance metric of the 5G network while the synthetic data is being provided to the 5G network. The network monitor may determine that one or more network components of the plurality of network components are likely to fail based at least in part on the performance metric. In response to determining that one or more network components of the plurality of network components are likely to fail, the network parameter generator may determine a dynamic threshold associated with the performance metric. The dynamic threshold may include a data mix of at least the first and second data types in respective amounts.

In some embodiments, the system may use a machine learning model to generate the synthetic data. The first data type may be voice data, and the second data type is application data. The synthetic data may include at least one of voice data, application data, and short-messaging service data. The plurality of network components may be implemented in a cloud-based architecture hosted by a public cloud-services provider. The 5G network may be a test-environment replica of a live 5G network and the network parameters may be applied to the live 5G network. The synthetic data may be based at least in part on historical data associated with the 5G network.

A non-transitory computer-readable medium may include instructions that, when executed by a processor, cause the system to perform operations. The method may include increasing, by the computing device and to the 5G network, the amount of first data of the first data type until a first network component of the plurality of network components fails. The method may include determining, by the computing device, first failure data associated with the failure of the first network component of the plurality of network components and the first data type. The method may include providing, by the computing device and to the 5G network, an amount of second data of a second data type. The method may include increasing, by the computing device and to the 5G network, the amount of second data of the second data type until a second network component of the plurality of network components fails. The method may include determining, by the computing device, second failure data associated with the failure of the second network component and the second data type. The method may include generating, by the computing device, synthetic data based at least in part on the first failure data and the second failure data, the synthetic data including at least one of the first data type and the second data type. The method may include providing, by the computing device and to the 5G network, the synthetic data such that one or more of the plurality of network components fails. The method may include determining, by the computing device, third failure data associated with the failure of the network component and the synthetic data. The method may include generating, by the computing device, network parameters associated with the network component, the network parameters based at least in part on the third failure data.

DETAILED DESCRIPTION

Figure 1A:
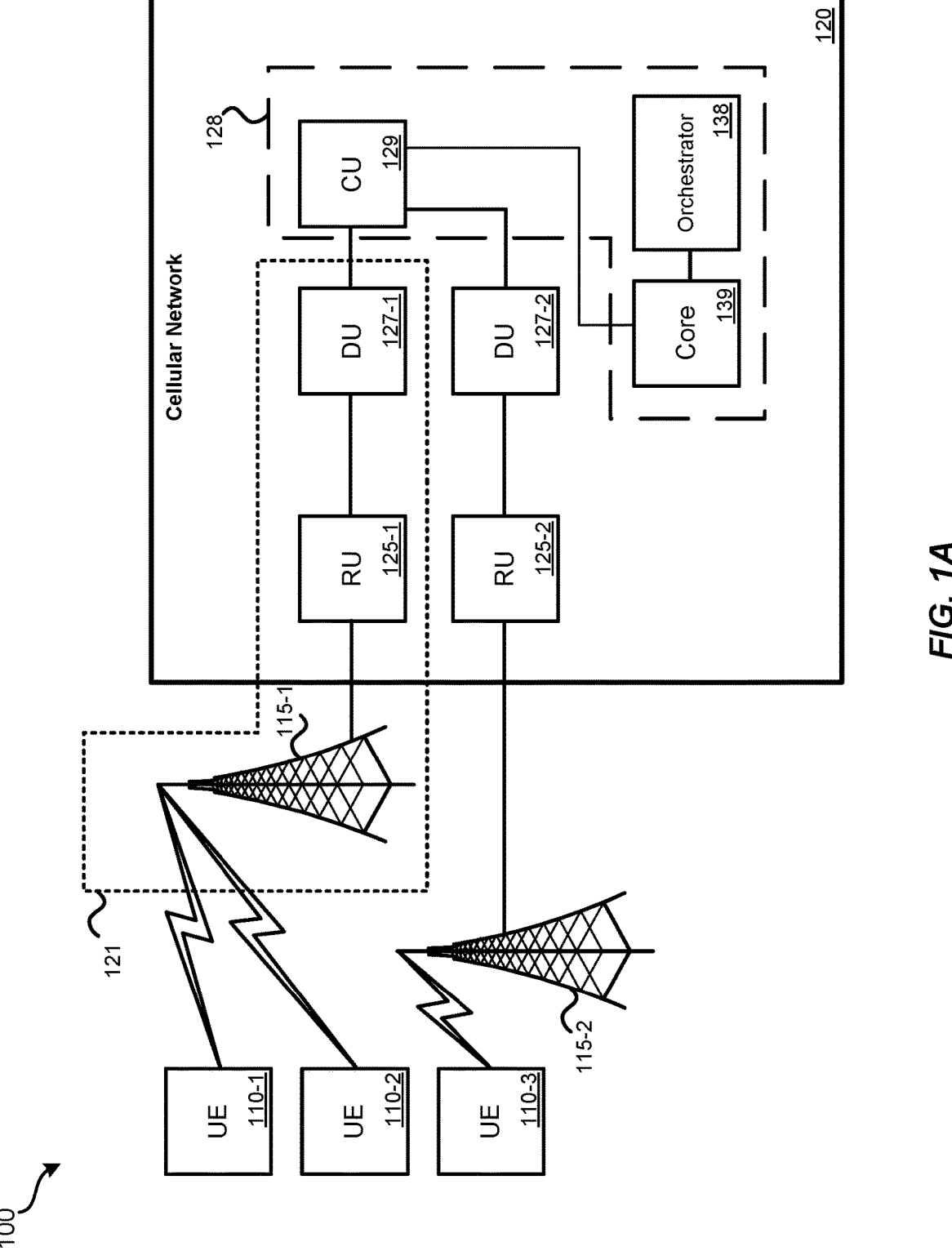
FIG. 1A illustrates an embodiment of a cellular network system, according to certain embodiments.

A 5G wireless network may include several network components working in conjunction with one another in order to provide wireless service across a region. Some or all of the network components may be implemented via a cloud-based architecture, hosted by a public cloud-services provider (e.g., Amazon Web Services®, Microsoft Azure®, etc.). One advantage to a cloud-based architecture like the one described above may be an ability to generate more components in order to meet an expected service need. For example, a wireless network may include both hardware and software components. If network traffic exceeds a capacity of a hardware component, adding additional hardware components may increase the capacity of the wireless network. Adding more hardware components may be both slow and expensive, and thus may generally be able to handle significantly more network traffic than expected.

By contrast, software-based network components may have a capacity significantly lower than the capacity of hardware-based components. The software components (sometimes "network components"), however, may be quickly replicated, with multiple instances of the same network component performing similar tasks within the wireless network. In wireless networks where the software components are hosted by the 5G wireless network provider, a limiting factor may be the amount of storage and/or processing power the 5G wireless network provider owns. In a cloud-based architecture, however, the amount of storage and processing power available may far exceed that of the 5G wireless network provider, allowing more software components to be created essentially at will.

In order to create more network components, a 5G wireless network provider may need to know which network components will fail at what point. For example, during a period of unusually high voice volume on a wireless network, an Internet Protocol Multimedia Service (IMS) may fail. During a period of unusually high application data volume on the wireless network, a user plane function (UPF may fail). Other data types may cause other failures. However, typical wireless network traffic may generally include a high volume of solely a particular data type (e.g., voice data, application data, multimedia messaging service data, etc.), but rather a data mix composed of various data types at various respective levels. The data mix of wireless network traffic may vary constantly, with the amounts of each data type changing independently at all times. Specific data mixes at any given point may cause yet other failures, sometimes unpredictably. Thus, it may improve the robustness of a live 5G wireless network to identify and/or predict failure points at a given data mix.

To know which network components will fail at what point, the wireless network provider injecting various amounts of data types into a test 5G wireless network, noting which components break. A computing device may inject a data type (e.g., voice data) at varying levels into the test 5G wireless network to determine a failure associated with the data type. This may be repeated for each data type a live 5G wireless network may handle. Determining when a certain amount of a particular data type causes a failure is useful but may not be sufficient to provide the robustness required in the live 5G wireless network. Furthermore, determining when a network component is about to fail may be still more useful, as a new instance of the network component may be created before there is a service disruption in the wireless network. Systems and techniques may be needed to test a 5G wireless network to determine and/or predict when a network component may fail based at least in part on a data mix.

One solution may be to provide a synthetic mix of data to a 5G network in a testing environment. First, a computing device may inject data of various types one at a time into the test 5G network in increasing amounts until one or more network components fail. Data associated with the failures may then be collected by the computing device (e.g., what component failed, what data type and in what amount, etc.). The data associated with the failures may then be provided to a synthetic data generator. The synthetic data generator may include a machine learning model (MLM) that determines a data mix for the synthetic data and represent real data traffic that may be handled by a 5G network in a live environment (or "live 5G wireless network). The synthetic data generator may inject the synthetic data with a first data mix and monitor the performance of the 5G network in response to the synthetic data. As the performance of the 5G network begins to degrade in response to the synthetic data, metrics associated with the first data mix of the synthetic data, the performance of one or more network components, and other metrics may be stored by the computing device. Based at least in part on the composition of the synthetic data and/or the performance of the 5G network, the MLM may then inject synthetic data including a second data mix to the 5G network, again recording metrics associated with performance degradation and/or failures of the 5G network. This process may be repeated continuously to determine various data mixes that are likely to cause failures.

The metrics may then be used, at least in part, to generate a dynamic threshold for the live 5G network. The dynamic threshold may be used to create new network components as a data mix on the live 5G network begins to degrade in a similar way to the test 5G network. In other words, the dynamic threshold may be used by the 5G network provider to create network components before the network breaks.

The systems and methods described herein may provide several advantages over current network testing techniques. For example, as the number of data types handled by a wireless network grow, the data mix experienced by the wireless network becomes more complex, with more variables. Traffic experienced by the wireless network at any given time may be unique; network components may fail in unexpected ways due to some specific data mix at a given point. By using a MLM in a synthetic data injector, failures may be found and/or inferred more efficiently than if every iteration had to generated, injected, and monitored "by hand." Not only may thresholds be found more efficiently, but otherwise-unexpected failures may be predicted by using the synthetic data injector. In other words, the MLM may learn from all scenarios provided during the injection of synthetic data, even as the synthetic data is being provided to the 5G network. Furthermore, the MLM in the synthetic data injector may be trained on historical real-world failures. The synthetic data injector may use the historical real-world failures to modify the synthetic data and provide even more robustness to a live 5G network via the dynamic threshold.

FIG. 1A illustrates an embodiment of a cellular network system 100 ("system 100"), according to certain embodiments. System 100 can include a 5G New Radio (NR) cellular network; other types of cellular networks, such as 4G LTE, 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or core 139. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 1B:
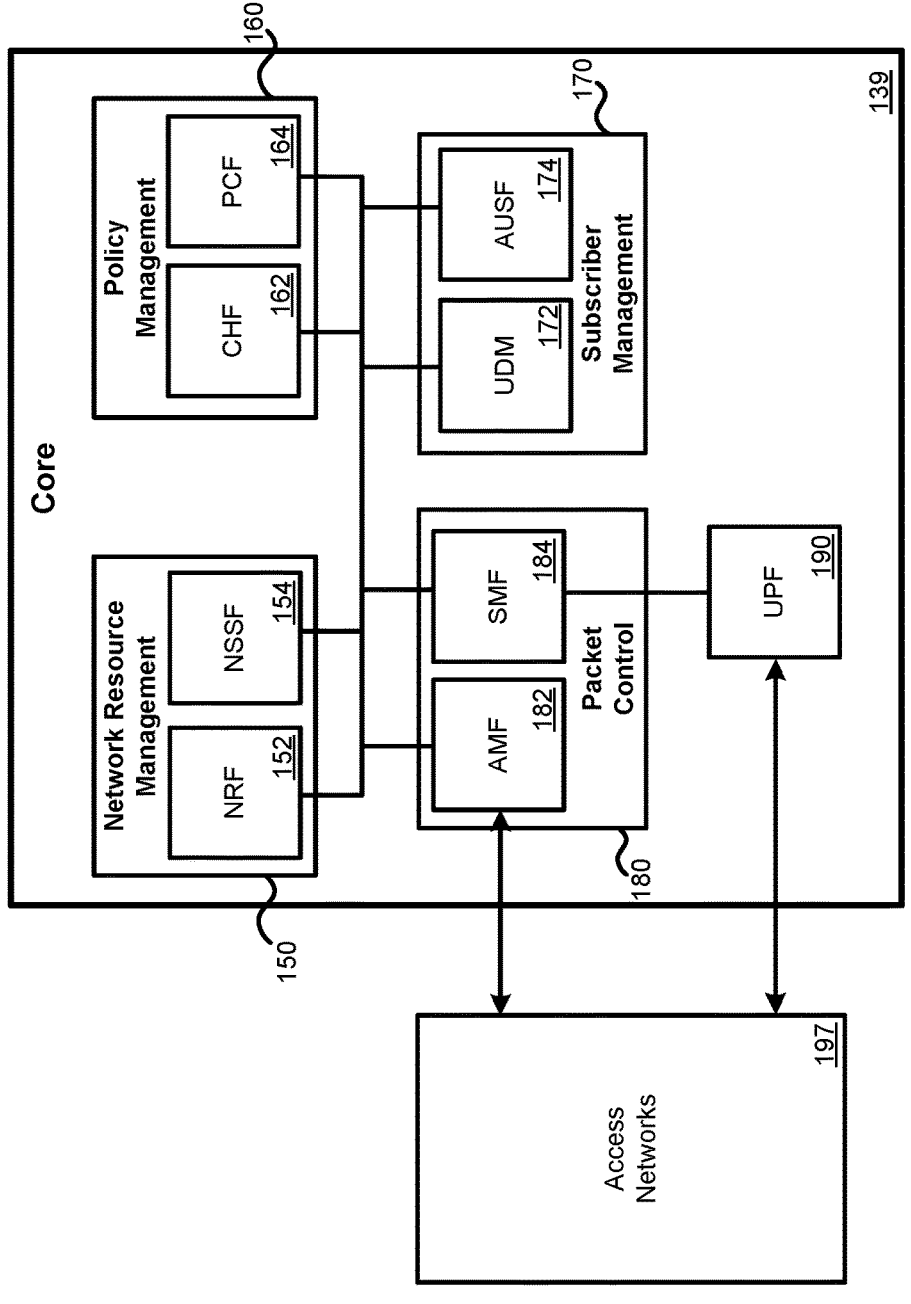
FIG. 1B illustrates an embodiment of an exemplary core, according to certain embodiments.
Figure 1B:

Further detail regarding exemplary core 139 is provided in relation to FIG. 1B. Core 139, which can be physically distributed across data centers or located at a central national data center (NDC) as detailed in relation to FIG. 2, can perform various core functions of the cellular network. Core 139 can include: network resource management components 150; policy management components 160; subscriber management components 170; and packet control components 180. Individual components may communicate on a bus, thus allowing various components of core 139 to communicate with each other directly. Core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

In a possible O-RAN implementation, DUs 127, CU 129, core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 1A, UE 110 may be operating on one or more production slices of cellular network 120. As detailed later in this document, UE that function on a particular entity's local network may be assigned to a slice particular to the entity or a slice that provides a particular QoE for tasks to be performed by the entity's UE.

Components such as DUs 127, CU 129, orchestrator 138, and core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
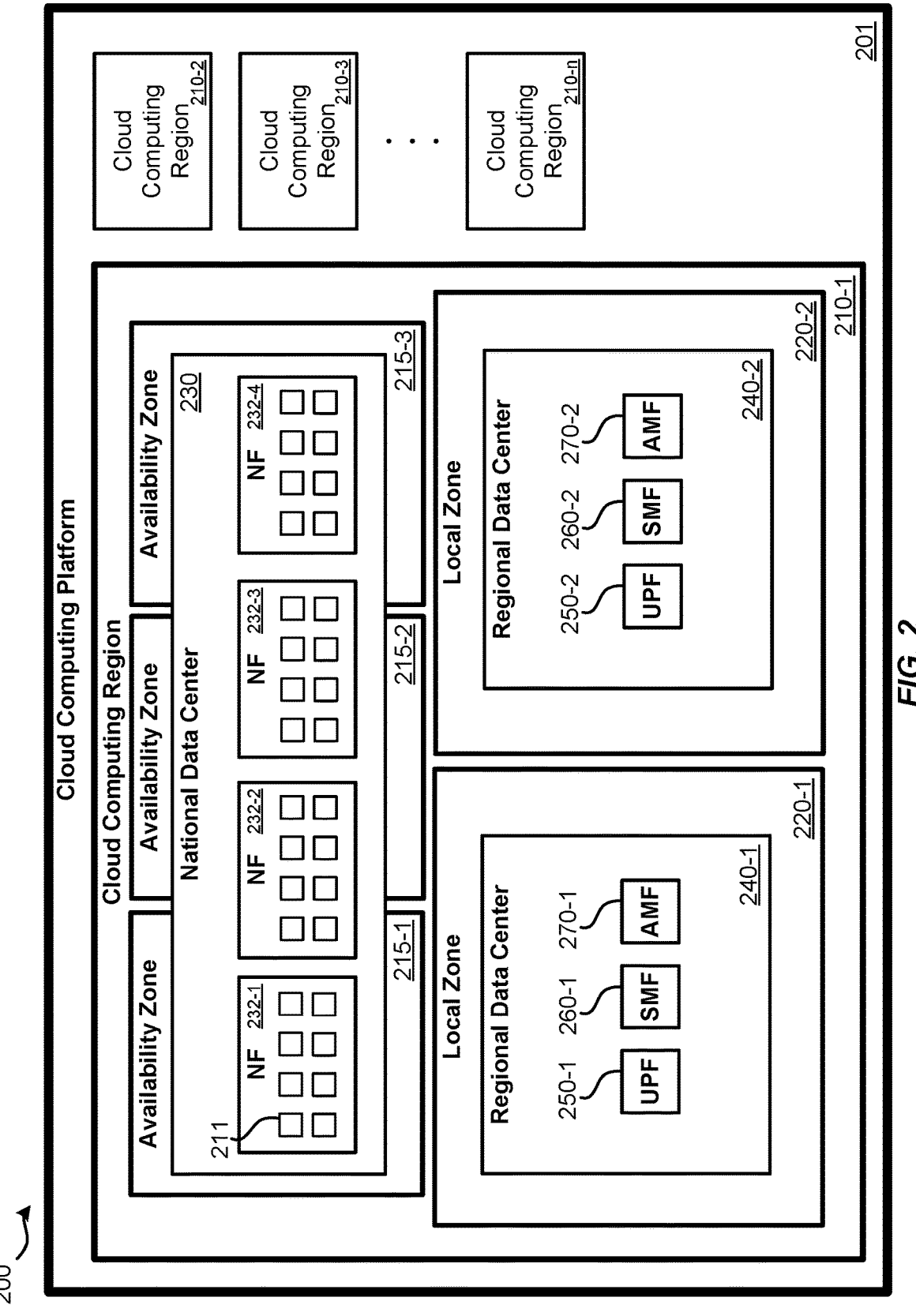
FIG. 2 illustrates an embodiment of a cellular network core network topology as implemented on a public cloud-computing platform, according to certain embodiments.

FIG. 2 illustrates an embodiment of a cellular network core network topology 200 as implemented on a public cloud-computing platform, according to certain embodiments. Cellular network core network topology 200 can represent how logical cellular network groups are distributed across cloud computing infrastructure of cloud computing platform 201. Cloud computing platform 201 can be logically and physically divided up into various different cloud computing regions 210. Each of cloud computing regions 210 can be isolated from other cloud computing regions to help provide fault tolerance, fail-over, load-balancing, and/or stability and each of cloud computing regions 210 can be composed of multiple availability zones, each of which can be a separate data center located in general proximity to each other (e.g., within 600 miles). Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 is illustrated. Similar components may be executed in other cloud computing regions of cloud computing regions 210 (210-2, 210-3, 210-$n$).

In other embodiments, cloud computing platform 201 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 210 may include multiple availability zones 215. Each of availability zones 215 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 215. For example, a database that is maintained as part of NDC 230 may be replicated across availability zones 215; therefore, if an availability zone of the cloud computing region is unavailable, a copy of the database remains up-to-date and available, thus allowing for continuous or near continuous functionality.

On a (public) cloud computing platform, cloud computing region 210-1 may include the ability to use a different type of data center or group of data centers, which can be referred to as local zones 220. For instance, a client, such as a provider of the hybrid cloud cellular network can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 220 rather than availability zones 215. In some circumstances, a geographic region can have both a local zone and an availability zone.

In the topology of a 5G NR cellular network, 5G core functions of core 139 can logically reside as part of a national data center (NDC). NDC 230 can be understood as having its functionality existing in cloud computing region 210-1 across multiple availability zones 215. At NDC 230, various network functions, such as NFs 232, are executed. For illustrative purposes, each NF, whether at NDC 230 or elsewhere located, can be comprised of multiple subcomponents, referred to as pods (e.g., pod 211) that are each executed as a separate process by the cloud computing environment. The illustrated number of pods is merely an example; fewer or greater numbers of pods may be part of the respective 5G core functions. It should be understood that in a real-world implementation, a cellular network core, whether for 5G or some other standard, can include many more network functions. By distributing NFs 232 across availability zones, load-balancing, redundancy, and fail-over can be achieved. In local zones 220, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed in local zones 220, SMFs 260 may be executed across multiple local zones 220 for redundancy, processing load-balancing, and fail-over.

Figure 3:
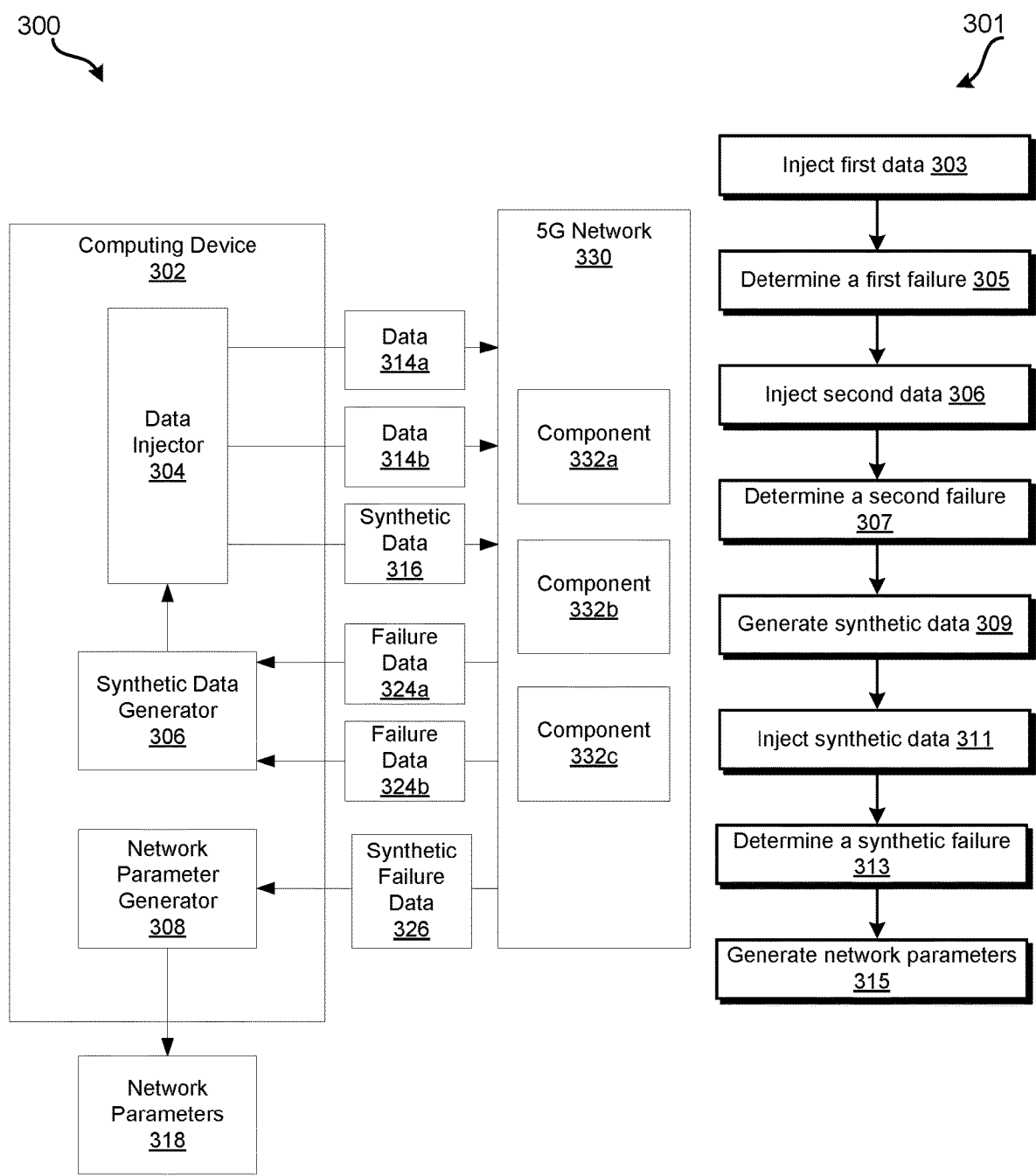
FIG. 3 illustrates a system and a process for the intelligent injection of synthetic data into a 5G network, according to certain embodiments.

FIG. 3 illustrates a system 300 and a process 301 for the intelligent injection of synthetic data 316 into a 5G network 330, according to certain embodiments. The system 300 may include a computing device 302. The computing device 302 may include one or more physical machines and/or virtual machines. The computing device 302 may include a data injector 304, a synthetic data generator 306, and a network parameter generator 308. The data injector 304, the synthetic data generator 306, and/or the network parameter generator 308 may include hardware and/or software components thereof. Furthermore, the data injector 304, the synthetic data generator 306, and the network parameter generator 308 may all be components of one computing device 302 (as shown) or may be implemented in a cloud-based architecture and hosted on different devices (or instances of virtual machines).

The 5G network 330 may be a replica of a live 5G wireless network, implemented in a testing environment. The 5G network 330 may be similar to the cellular networks described in the system 100 in FIGS. 1A and 1B and/or the cellular network core network topology 200 in FIG. 2. The 5G network 330 may include network components 332a-d. The network components 332a-d may be components in any DU or CU (e.g., the DU 127-1 and CU 129). For example, the CU may include components such as such as a service data adaptation protocol (SDAP), a packet data convergence protocol (PDCP), and a radio resource control (RRC). The DU may include components such as a radio link control (RLC) and a medium access control (MAC). The network components 332a-d may also include components of a 5G core (as shown in FIG. 1B) such as the UPF 190, the AMF 182, the SMF 184, or any other such network component. Although the systems and techniques described herein may largely reference components related to a 5G core it should be understood that the techniques described herein may be applied to a CU, DU and/or the 5G core of a 5G network. The 5G network 330 may be implemented on a different resource than the live 5G wireless network and therefore be able to be "broken" without disrupting the live 5G wireless network.

At step 303, the data injector 304 may inject data 314a into the 5G network 330. The data 314a may be of a first data type (e.g., voice data). Injecting the data 314a may represent or mimic network traffic of the first data type. The data injector 304 may cause an amount of the data 314a to be increased until one of the network components 332a-d fails. For example, the data 314a may represent voice over internet protocol (VOIP), and the network component 332a may be an IP multimedia subsystem (IMS). When the amount of data 314a increases beyond a capacity of the network component 332a, the IMS (e.g., the network component 332a) may fail.

At step 305, the computing device 302 may determine a first failure and collect failure data 324a from the 5G network 330. The failure data 324a may be associated with the data 314a. The failure data 324a may include metrics associated with the data 314a (e.g., the amount and type of the data 314a), metrics associated with the network component(s) 332a-d involved in the first failure, and other such metrics. The failure data 324a may be provided to the synthetic data generator 306 and/or stored in a database for later use.

At step 306, the data injector 304 may inject data 314b into the 5G network 330. The data 314b may be a second data type (e.g., MMS data). The data injector 304 may increase the amount of the data 314b injected into the 5G network 330 until one or more of the network components 332a-d fails. For example, the data 314b may be MMS data, and the network component 332b may be a multimedia messaging service center (MMSC). When the amount of data 314b injected into the 5G network 330 exceeds a capacity of the MMSC, the MMSC (the network component 332b) may fail.

At step 307, the computing device 302 may determine a second failure and collect failure data 324b from the 5G network 330. The failure data 324b may be associated with the data 314b. The failure data 324b may include metrics associated with the data 314b (e.g., the amount and type of the data 314b), metrics associated with the network component(s) 332a-d involved in the second failure, and other such metrics. The failure data 324b may be provided to the synthetic data generator 306 and/or stored in a database for later use.

At step 309, the synthetic data generator 306 may generate synthetic data 316 and provide the synthetic data 316 to the data injector 304. The synthetic data generator 306 may utilize the failure data 324a-b to determine a data mix of the synthetic data 316. The synthetic data 316 may therefore include the data 314a-b and other data types in varying amounts. The synthetic data generator may vary the data mix of the synthetic data 316 continuously, or may adjust the data mix in discreet steps, monitoring the performance of the 5G network 330 for some time period at each step.

At step 311, the data injector 304 may provide the synthetic data 316 to the 5G network 330. Injecting the synthetic data 316 may represent or mimic network traffic that may be experienced by a live 5G network. For example, a live 5G network is unlikely to experience traffic composed of a single data type. Instead, traffic on the live 5G network is likely to be composed of various data types, amounts of which are constantly changing. The injection of synthetic data 316 may therefore better represent real-life scenarios than the injection of the data 314a-b.

As described above, the synthetic data generator 306 may continuously adjust the data mix of the synthetic data 316 as the synthetic data 316 is being injected into the 5G network 330. This may further mimic real-life scenarios, as a variable data mix of traffic may be more likely than a static data mix in a live 5G network. The synthetic data generator 306 may adjust the synthetic data 316 based on real-time performance metrics detected in the 5G network 330 such that a network component(s) 332a-d fails, causing a "synthetic failure," meaning a failure caused by the synthetic data 316.

At step 313, the computing device 302 may determine the synthetic failure and collect synthetic failure data 326. The synthetic failure data 326 may include metrics associated with the synthetic data 316 such as the data mix, metrics associated with the network component(s) 332a-d involved in the synthetic failure, and other such metrics. The synthetic failure data 326 may be provided to the synthetic data generator 306 to provide real-time feedback associated with the synthetic data 316 and/or stored in a database for later use. The synthetic failure data 326 may additionally or alternatively be provided to the network parameter generator 308.

At step 315, the network parameter generator 308 may generate network parameters 318, based at least in part in the synthetic failure data 326. The network parameters 318 may include a dynamic threshold. The dynamic threshold may include one or more references to data mixes that are likely to cause failures in one or more network components such as the network components 332a-d. Network traffic on a live 5G wireless network may likely be dynamic, with a constantly changing data mix. The dynamic threshold may enable the live 5G wireless network to create new instances of network components to avoid failures, as the dynamic threshold is also based on a constantly changing data mix. The network parameters 318 may then be stored and/or provided to the live 5G wireless network.

Figure 4:
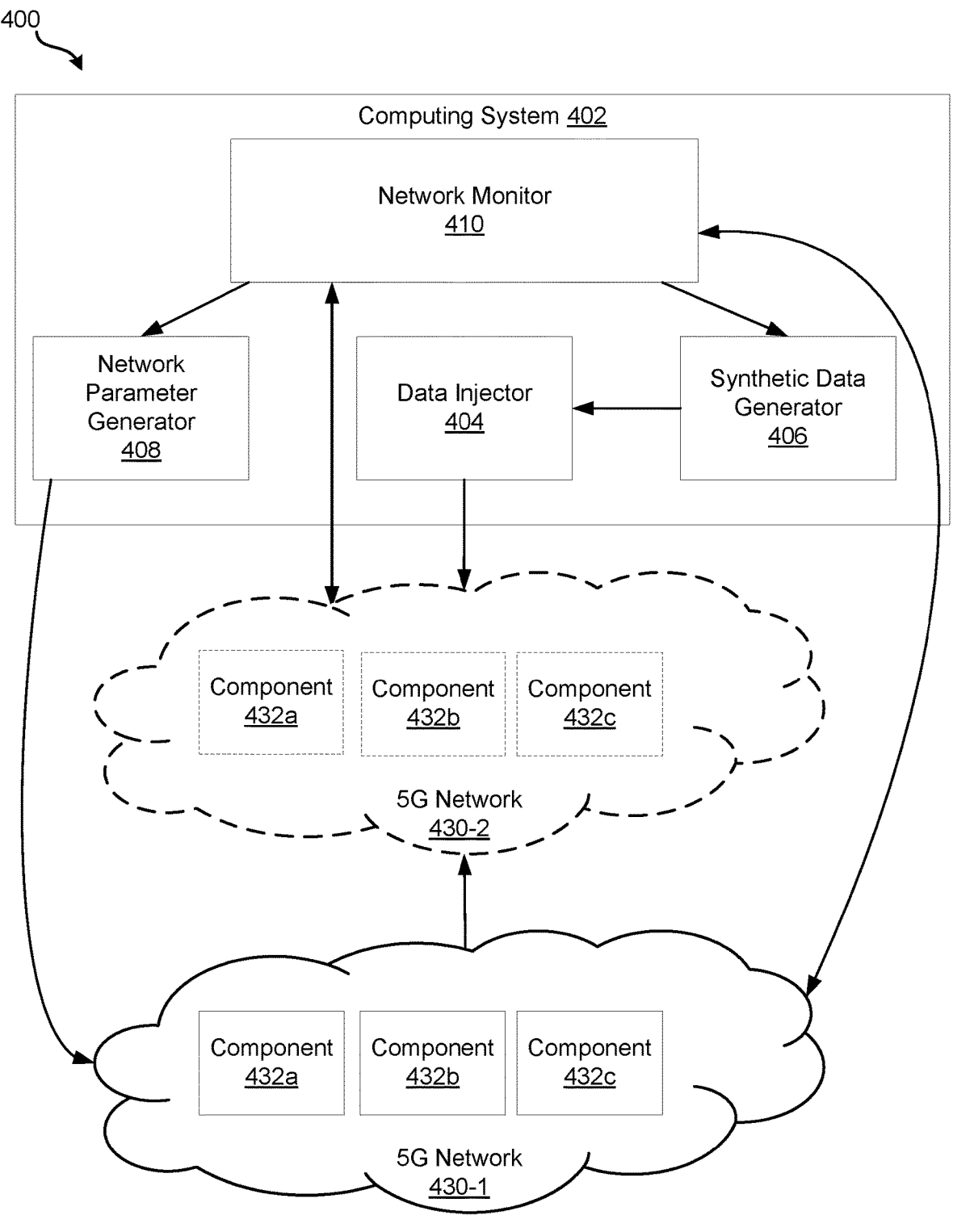
FIG. 4 illustrates a diagram of a system for intelligently injecting data into a 5G network, according to certain embodiments.

FIG. 4 illustrates a diagram of a system 400 for intelligently injecting data into a 5G network 430, according to certain embodiments. The system 400 may include a computing system 402, and 5G networks 430-1 and 430-2. The computing system 402 may be similar to the computing device 302 in FIG. 3, and include a data injector 404, a synthetic data generator 406, a network parameter generator 408, and a network monitor 410. The 5G network 430-1 may be a live 5G wireless network similar to the system 100, providing wireless service to one or more UE's. The components 432a-b may therefore be any component of a cellular network, such as an AMF, SMF, IMS, etc. The 5G network 430-2 may be an exact replica of the 5G network 430-1 and include identical instances of the network components 432a-c. of the 5G network 430-1.

The data injector 404 may inject data provided by the computing system 402 to the 5G network 430-2. The data provided by the computing system 402 may be of a single data type, injected in varying amounts. The injection of data into the 5G network 430-2 may replicate or mimic data traffic on the 5G network 430-1. For example, the data may be injected into a UPF of the 5G network 430-2 and/or an AMF of the 5G network 430-2, replicating a data path taken by normal traffic in a live 5G wireless network (e.g., the 5G network 430-1). The data may then travel through the various network components 432a-c as if it were real-life data traffic.

The data injector 404 may additionally or alternatively inject data provided by the synthetic data generator 406. The synthetic data generator 406 may generate synthetic data including a data mix. The data mix may include one or more data types in respective amounts, and therefore better replicate data traffic scenarios that may be experienced by the 5G network 430-1.

While the data and/or synthetic data is being injected in to the 5G network 430-2, the network monitor 410 may determine one or more performance metrics associated with the performance of the 5G network 430-2. The one or more performance metrics may include a respective percentage-of-capacity of each of the network components 432a-c, an average response time of data traffic flowing through the 5G wireless network, a packet-loss rate, and other such performance metrics. The network monitor 410 may then provide data indicating the one or more performance metrics to the synthetic data generator 406 and/or the network parameter generator. In some embodiments, the network monitor 410 may also collect live data by monitoring the 5G network 430-1 (e.g., a live 5G network). The live data may include a comparison of the actual data traffic flowing through the 5G network 430-1 and the synthetic data, performance metrics of the 5G network 430-1, and other such data. The network monitor 410 may then provide the live data to the synthetic data generator 406 and/or the network parameter generator 408.

Using the one or more performance metrics and/or the live data, the network monitor 410 may determine that one or more of the network components 432a-c are close to failure. For example, a particular performance metric reaching a critical level may be correlated with a failure of a specific network component 432a-c (e.g., a packet loss rate over 5% correlates with a failure of a UPF). The correlation may be based off of previous failures detected by the computing system through previous testing and/or historical live failure data. Upon determining that the performance metric has reached the critical level, the network monitor 410 may cause the network parameter generator 408 to include the performance metric and the critical level in a dynamic threshold. The network monitor 410 may provide data to a component of the 5G network 430-2 that causes a new network component to be generated, avoiding the failure. In other words, the network monitor 410 may be able to predict a failure within the 5G network 430-2 before it occurs. The prediction may then be used by the network parameter generator 408 to create a dynamic threshold.

The network parameter generator 408 may combine the one or more performance metrics and any known levels associated with each in the dynamic threshold. In some embodiments, the dynamic threshold may be implemented by the 5G network 430-2, and further tested using the injection of synthetic data. If the one or more performance metrics remain below the associated critical value, the network parameter generator 408 may provide the dynamic threshold to the 5G network 430-1.

Figure 5:
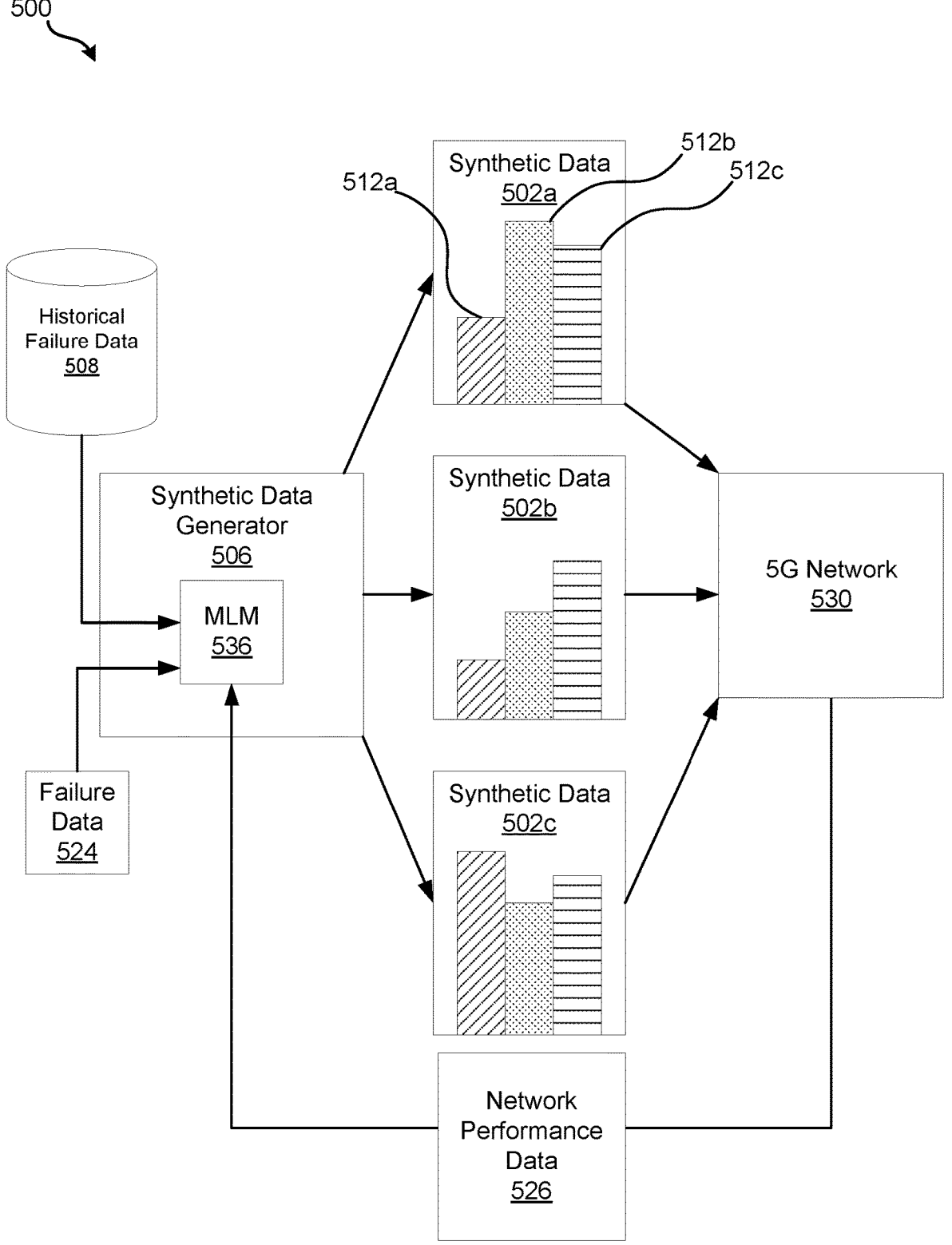
FIG. 5 illustrates a synthetic data generator with a machine learning model for generating synthetic data, according to certain embodiments.

FIG. 5 illustrates a synthetic data generator 506 with a machine learning model 536 for generating synthetic data, according to certain embodiments. The synthetic data generator 506 may be similar to the synthetic data generator 306 in FIG. 3 and/or the synthetic data generator 406 in FIG. 4. The synthetic data generator 506 may include a machine learning model (MLM) 536 configured to adjust a data mix of synthetic data 502a-b according to one or more inputs such as historical failure data 508, failure data 524, and network performance data 526. The synthetic data 502a-c may include a data mix including of one or more data types 512a-c in varying amounts. The data types 512a-c may include voice data, MMS data, short messaging service (SMS) data, application data, or any other type of data.

In some embodiments, the MLM 536 may be trained on the historical failure data 508. The historical failure data 508 may include logs, reports, or other such information associated with previous network failures. The previous network failures may originate in a live 5G network such as the 5G network 430-1 in FIG. 4, or a test 5G network such as the 5G network 430-2. The MLM 536 may then use the historical failure data 508 to identify known failure conditions for one or more network components on a 5G network 530. For example, the previous network failures may be from a similarly sized 5G network to the 5G network 530 and therefore known failures may be relevant. In other examples, the 5G network may be completely new, Therefore, the MLM 536 may not be trained using the historical failure data 508.

The failure data 524 may be similar to the failure data 324a-b in FIG. 3 and be associated with specific data types injected into the 5G network 530 one at a time. The MLM 536 may then be trained on the failure data 524 and use failure data 524 to identify critical amounts of each data type that caused one or more network components to fail.

After initial training, the synthetic data generator 506 may use the MLM 536 to generate the synthetic data 502a and inject the synthetic data 502a into the 5G network 530. The synthetic data 502a may be based at least in part on the training data provided to the MLM 536 (e.g., the historical failure data 508 and/or the failure data 524). The data mix of the synthetic data 502a may include a first amount of data type 512a, a second amount of data type 512b, and a third amount of data type 512c. In the example shown, the second amount may be the largest component of the data mix, the third amount may be the second largest, and the first amount may be the smallest.

The synthetic data generator 506 and/or the MLM 536 may then receive network performance data 526. The network performance data 526 may be generated by a network monitor such as the network monitor 410 in FIG. 4. The network performance data 526 may include one or more performance metrics and respective values, including any critical values associated with a failure of one or more network components of the 5G network 530 due to the synthetic data 502*a*. The synthetic data generator 506 and/or the MLM 536 may the adjust the data mix and generate the synthetic data 502*b*, injecting the synthetic data 502*b* into the 5G network 530. The synthetic data 502*b* may include a fourth amount of data type 512*a*, a fifth amount of data type 512*b*, and a sixth amount of data type 512*c*. In the example shown, the sixth amount may be the largest component of the data mix, the fifth amount the next largest, and the fifth amount may be the smallest.

Again, the synthetic data generator and/or MLM 536 may receive the network performance data 526. The network performance data 526 may include one or more performance metrics and respective values, including any critical values associated with a failure of one or more network components of the 5G network 530 due to the synthetic data 502*b*. In response, the synthetic data generator 506 and/or the MLM 536 may the adjust the data mix and generate the synthetic data 502*c*, injecting the synthetic data 502*c* into the 5G network 530. The synthetic data 502*c* may include a seventh amount of data type 512*a*, an eighth amount of data type 512*b*, and a ninth amount of data type 512*c*. In this example, the seventh amount may be the largest component of the data mix, the ninth amount may be the next largest, and the eighth amount may be the smallest.

Although only three iterations of the synthetic data 502*a-c* are shown, any number of iterations may be generated by the synthetic data generator 506. Furthermore, although only three data types 512*a-c* are shown, it should be understood that the synthetic data 502*a-c* may include any number of data types. Determining the failure points associated with a specific data mix may become impractical as the number of data types grows. The systems and techniques described herein, including those using the synthetic data generator 506, thus enable failure points to be determined more efficiently.

Figure 6:
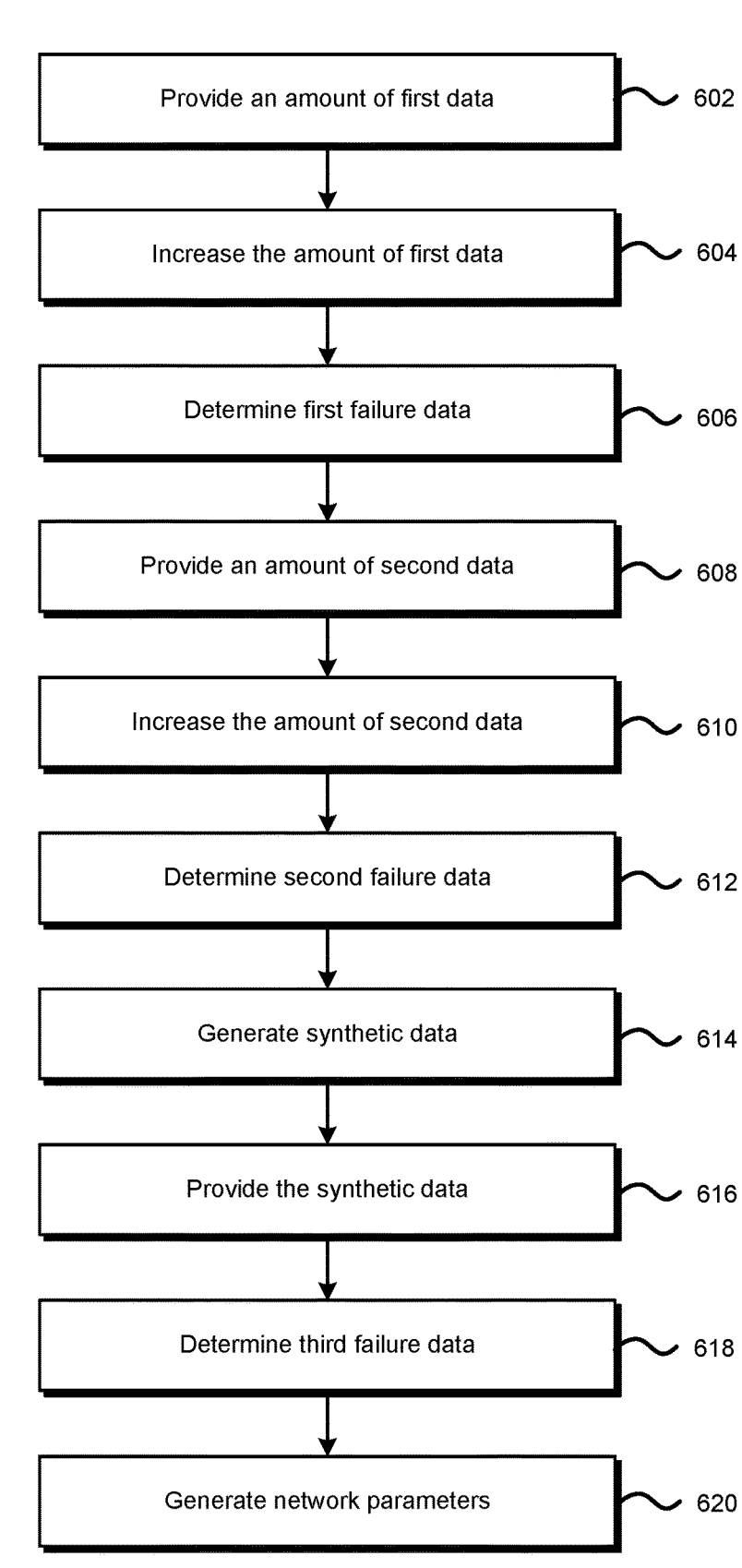
FIG. 6 illustrates a flowchart of a method for injecting synthetic data into a wireless network, according to certain embodiments.

FIG. 6 illustrates a flowchart of a method 600 for injecting synthetic data into a wireless network, according to certain embodiments. The method 600 may be performed by some or all of the systems and methods described herein, such as the systems 300, 400, and 500 in FIGS. 3, 4, and 5, respectively. Some or all of the steps of the method 600 may be combined, performed in a different order than is shown and described, or skipped altogether.

At step 602, the method 600 may include providing, by a computing device and to a 5G network, an amount of first data of a first data type. The computing device may be similar to the computing device 302 in FIG. 3. The computing device may be a single physical or virtual machine, or the computing device may be implemented on a distributed cloud-based architecture. The first data type may include voice data, MMS data, short messaging service (SMS) data, application data, or any other such data type. The first data type may be injected into the 5G network to mimic data traffic on a live 5G network. The 5G network may include a plurality of network components. The plurality of network components may be similar to those described in FIGS. 1A-B and FIG. 2. As such, the plurality of network components may include hardware-based components (e.g., an RU) and software-based components (e.g., a UPF, an AMF, an SMF, etc.). The 5G network may be a replica of a live 5G network, implemented in a testing environment, similar to the 5G network 430-2 in FIG. 4. In some embodiments, the 5G network may represent a theoretical network and be tested before a live version of the theoretical network is deployed.

At step 604, the method 600 may include increasing, by the computing device, the amount of first data of the first data type until one or more of the network components fails. The amount of first data may be increased continuously or may be increased in discreet steps. In the example where the amount of first data is increased in discreet steps, the computing device may continue to provide the first data for a given time period (e.g., 5 seconds-90 seconds, inclusive) before increasing the amount of first data to the next discreet step.

At step 606, the method 600 may include determining, by the computing device, first failure data associated with the one or more network components and/or the first data type. The first failure data may be similar to the failure data 324*a-b* in FIG. 3. The first failure data may be determined using a network monitor of the computing device, such as the network monitor 410 in FIG. 4. The first failure data may include one or more performance metrics. The one or more performance metrics may include a respective percentage-of-capacity of each of the plurality network components, an average response time of data traffic flowing through the 5G wireless network, a packet-loss rate, and other such performance metrics.

At step 608, the method 600 may include providing, by the computing device, an amount of second data of a second data type to the 5G network. The second data type may be different than the first data type. For example, if the first data type is voice data, the second data type may be MMS data. The second data type may be injected into the 5G network to mimic data traffic on a live 5G network.

At step 610, the method 600 may include increasing, by the computing device, the amount of the second data of the second data type until one or more of the network components fails. The amount of second data may be increased continuously or may be increased in discreet steps. In the example where the amount of first data is increased in discreet steps, the computing device may continue to provide the first data for a given time period (e.g., 5 seconds-90 seconds, inclusive) before increasing the amount of second data to the next discreet step.

At step 612, determining, by the computing device, second failure data associated with the one or more network components and/or the second data type. The second failure data may be similar to the failure data 324*a-b* in FIG. 3. The second failure data may be determined using a network monitor of the computing device, such as the network monitor 410 in FIG. 4. The second failure data may include the one or more performance metrics such as a respective percentage-of-capacity of each of the plurality network components, an average response time of data traffic flowing through the 5G wireless network, a packet-loss rate, and other such performance metrics.

Both the first and second failure data may be provided to a synthetic data generator, similar to the synthetic data generator 506 in FIG. 5. Then, at step 614, the method 600 may include generating, by the computing device, synthetic data. The computing device may use the synthetic data generator to generate the synthetic data. The synthetic data may include a data mix including at least one of the first data type and the second data type. The data mix may also include other data types. All data types in the data mix may be provided by the computing devices in respective amounts. In part because of the data mix, the synthetic data may better represent real-world data traffic flowing through a 5G network.

At step 616, the method 600 may include providing, by the computing device, the synthetic data to the 5G network.

In some embodiments, the data mix of the synthetic data may not be varied until one or more of the plurality of network components fails. In other embodiments, the computing system may monitor the one or more performance metrics, and determine that one or more of the network components are likely to fail. In response, the computing device may vary the data mix of the synthetic data, and log data associated with the data mix and the one or more performance metrics.

At step 618, the method 600 may include determining, by the computing device, third failure data associated with the failure of the one or more network components of the plurality of network components. The failure data may also include data associated with the synthetic data such as the one or more performance metrics, the data mix of the synthetic data at the time of the failure, and other such data. In some embodiments, the third failure data may not be related to a failure, but instead a predicted failure. For example, one or more of the performance metrics may indicate that one or more of the network components are likely to fail. In response, the computing device may adjust the data mix of the synthetic data, and log data associated with the data mix and the one or more performance metrics.

At step 620, the method 600 may include generating, by the computing device, network parameters associated with the 5G network, based at least in part on the third failure data. The network parameters may include a dynamic threshold. The dynamic threshold may include one or more references to data mixes that have caused and/or are likely to cause failures in one or more network components. Network traffic on a live 5G wireless network may likely be dynamic, with a constantly changing data mix. The dynamic threshold may enable the live 5G wireless network to create new instances of network components to avoid failures, as the dynamic threshold may be based on a changing data mix. The network parameters may then be stored and/or provided to the live 5G wireless network.

In some embodiments, the method 600 may also include monitoring, by the computing device, the one or more performance metrics of the 5G network while the synthetic data is being provided to the 5G network. The computing device may then determine that one or more of the plurality of network components are likely to fail, based at least in part on at least one of the one or more performance metrics. The computing device may then determine a dynamic threshold associated with the one or more performance metrics. The dynamic threshold may include a data mix of at least the first and second data types in respective amounts and indicate that a failure may be likely if data traffic exceeds one or both of the respective amounts.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:

providing, by a computing device and to a 5G network, an amount of first data of a first data type, the 5G network comprising a plurality of network components;

increasing, by the computing device and to the 5G network, the amount of first data of the first data type until a first network component of the plurality of network components fails;

determining, by the computing device, first failure data associated with the failure of the first network component of the plurality of network components and the first data type;

providing, by the computing device and to the 5G network, an amount of second data of a second data type;

increasing, by the computing device and to the 5G network, the amount of second data of the second data type until a second network component of the plurality of network components fails;

determining, by the computing device, second failure data associated with the failure of the second network component and the second data type;

generating, by the computing device, synthetic data based at least in part on the first failure data and the second failure data, the synthetic data including at least one of the first data type and the second data type;

providing, by the computing device and to the 5G network, the synthetic data such that one or more of the plurality of network components fails;

determining, by the computing device, third failure data associated with the failure of the network component and the synthetic data; and generating, by the computing device, network parameters associated with the network component, the network parameters based at least in part on the third failure data.

2. The method of claim 1, further comprising:

monitoring, by the computing device, a performance metric of the 5G network while the synthetic data is being provided to the 5G network;

determining, by the computing device, that one or more network components of the plurality of network components are likely to fail based at least in part on the performance metric; and in response to determining that one or more network components of the plurality of network components are likely to fail:

determining, by the computing device, a dynamic threshold associated with the performance metric, the dynamic threshold comprising a data mix of at least the first and second data types in respective amounts.

3. The method of claim 1, wherein the computing device uses a machine learning model to generate the synthetic data.

4. The method of claim 1, wherein the first data type is voice data and the second data type is application data.

5. The method of claim 1, wherein the synthetic data comprises at least one of voice data, application data, and short-messaging service data.

6. The method of claim 1, wherein the plurality of network components are implemented in a cloud-based architecture hosted by a public cloud-services provider.

7. The method of claim 1, wherein the 5G network is a test-environment replica of a live 5G network and the network parameters are applied to the live 5G network.

8. The method of claim 1, wherein the synthetic data is based at least in part on historical data associated with the 5G network.

9. A system, comprising:

one or more processors;

a data injector;

a synthetic data generator;

a network monitor;

a network parameter generator; and a non-transitory computer-readable memory comprising instructions that, when executed by the one or more processors, cause the system to perform operations to:

provide, by the data injector and to a 5G network, an amount of first data of a first data type, the 5G network comprising a plurality of network components;

increase, by the data injector, the amount of first data of the first data type until a first network component of the plurality of network components fails;

determine, by the network monitor, first failure data associated with the failure of the first network component of the plurality of network components and the first data type;

provide, by the data injector and to the 5G network, an amount of second data of a second data type;

increase, by the data injector, the amount of second data of the second data type until a second network component of the plurality of network components fails;

determine, by the network monitor, second failure data associated with the failure of the second network component and the second data type;

generate, by the synthetic data generator, synthetic data based at least in part on the first failure data and the second failure data, the synthetic data including at least one of the first data type and the second data type;

provide, by the data injector and to the 5G network, the synthetic data such that one or more of the plurality of network components fails;

determine, by the network monitor, third failure data associated with the failure of the network component and the synthetic data; and generate, by the network parameter generator, network parameters associated with the network component, the network parameters based at least in part on the third failure data.

10. The system of claim 9, the operations further causing the system to:

monitor, by the network monitor, a performance metric of the 5G network while the synthetic data is being provided to the 5G network;

determine, by the network monitor, that one or more network components of the plurality of network components are likely to fail based at least in part on the performance metric; and in response to determining that one or more network components of the plurality of network components are likely to fail:

determine, by the network parameter generator, a dynamic threshold associated with the performance metric, the dynamic threshold comprising a data mix of at least the first and second data types in respective amounts.

11. The system of claim 9, wherein the system uses a machine learning model to generate the synthetic data.

12. The system of claim 9, wherein the first data type is voice data, and the second data type is application data.

13. The system of claim 9, wherein the synthetic data comprises at least one of voice data, application data, and short-messaging service data.

14. The system of claim 9, wherein the plurality of network components are implemented in a cloud-based architecture hosted by a public cloud-services provider.

15. The system of claim 9, wherein the 5G network is a test-environment replica of a live 5G network and the network parameters are applied to the live 5G network.

16. The system of claim 9, wherein the synthetic data is based at least in part on historical data associated with the 5G network.

17. A non-transitory computer-readable medium comprising instructions that, when executed by a processor of a computing device, cause the processor to perform operations comprising:

providing, by the computing device and to a 5G network, an amount of first data of a first data type, the 5G network comprising a plurality of network components;

increasing, by the computing device and to the 5G network, the amount of first data of the first data type until a first network component of the plurality of network components fails;

determining, by the computing device, first failure data associated with the failure of the first network component of the plurality of network components and the first data type;

providing, by the computing device and to the 5G network, an amount of second data of a second data type;

increasing, by the computing device and to the 5G network, the amount of second data of the second data type until a second network component of the plurality of network components fails;

determining, by the computing device, second failure data associated with the failure of the second network component and the second data type;

generating, by the computing device, synthetic data based at least in part on the first failure data and the second failure data, the synthetic data including at least one of the first data type and the second data type;

providing, by the computing device and to the 5G network, the synthetic data such that one or more of the plurality of network components fails;

determining, by the computing device, third failure data associated with the failure of the network component and the synthetic data; and generating, by the computing device, network parameters associated with the network component, the network parameters based at least in part on the third failure data.

18. The non-transitory computer-readable medium of claim 17, wherein the synthetic data comprises at least one of voice data, application data, and short-messaging service data.

19. The non-transitory computer-readable medium of claim 17, wherein the plurality of network components are implemented in a cloud-based architecture hosted by a public cloud-services provider.

20. The non-transitory computer-readable medium of claim 17, wherein the 5G network is a test-environment replica of a live 5G network and the network parameters are applied to the live 5G network.

* * * * *